United States Patent
Goguet-Chapuis et al.

(10) Patent No.: US 10,920,798 B2
(45) Date of Patent: Feb. 16, 2021

(54) HYDRAULIC CIRCUIT WITH CONTROLLED RECIRCULATION CIRCUIT

(71) Applicant: Safran Aircraft Engines, Paris (FR)

(72) Inventors: Benjamin André Goguet-Chapuis, Paris (FR); David Simon, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 135 days.

(21) Appl. No.: 15/807,990

(22) Filed: Nov. 9, 2017

(65) Prior Publication Data
US 2018/0128289 A1 May 10, 2018

(30) Foreign Application Priority Data
Nov. 10, 2016 (FR) ...................................... 1660903

(51) Int. Cl.
| F15B 11/15 | (2006.01) |
| F01D 25/20 | (2006.01) |
| B64C 11/40 | (2006.01) |
| F15B 13/02 | (2006.01) |
| F15B 1/26 | (2006.01) |

(52) U.S. Cl.
CPC .............. F15B 11/15 (2013.01); B64C 11/40 (2013.01); F01D 25/20 (2013.01); F15B 13/027 (2013.01); F05D 2260/602 (2013.01); F15B 1/26 (2013.01)

(58) Field of Classification Search
CPC ....... B64C 11/38; B64C 11/385; B64C 11/40; B64C 11/42; F15B 13/024; F15B 2211/41563; F15B 2211/45
See application file for complete search history.

(56) References Cited

U.S. PATENT DOCUMENTS

| 2,722,985 | A | * | 11/1955 | Biermann | ............. | B64C 11/385 |
| | | | | | | 416/157 R |
| 2,809,702 | A | * | 10/1957 | Lambeck | ................ | B64C 11/40 |
| | | | | | | 416/48 |
| 3,389,641 | A | * | 6/1968 | Barnes | .................. | B64C 11/305 |
| | | | | | | 416/157 R |

(Continued)

FOREIGN PATENT DOCUMENTS

| DE | 10 2012 212560 A1 | 1/2014 |
| EP | 2 075 419 A2 | 7/2009 |

(Continued)

OTHER PUBLICATIONS

Search Report issued in French Patent Application No. 16 60903 dated Jun. 14, 2017.

*Primary Examiner* — Abiy Teka
*Assistant Examiner* — Matthew Wiblin
(74) *Attorney, Agent, or Firm* — Pearne & Gordon LLP

(57) ABSTRACT

The invention relates to a hydraulic circuit (10) for an aircraft turboprop comprising a hydraulic fluid tank (16), a pump (14), a component (12) that is supplied with fluid pressurised by the pump (14) and that is selectively put into operation, and a fluid recirculation circuit (20) between the pump discharge (14) and the tank (16) characterised in that it comprises a valve (22) located in the recirculation circuit (20), that is capable of closing the recirculation circuit (20) when the component (12) is not in operation and is capable of opening the recirculation circuit (20) when the component is in operation.

5 Claims, 1 Drawing Sheet

(56) References Cited

U.S. PATENT DOCUMENTS

| | | | | |
|---|---|---|---|---|
| 3,439,745 | A | * | 4/1969 | Gaubis .................. B63H 3/081 |
| | | | | 416/154 |
| 4,671,736 | A | * | 6/1987 | Finnigan ................ B64C 11/38 |
| | | | | 416/46 |
| 5,364,231 | A | * | 11/1994 | Eick ....................... B64C 11/38 |
| | | | | 416/157 R |
| 2005/0166573 | A1 | | 8/2005 | Hommema |
| 2007/0001026 | A1 | | 1/2007 | Lecheler |
| 2010/0012434 | A1 | | 1/2010 | Pisseloup |
| 2013/0323050 | A1 | * | 12/2013 | Kleckler .................. F02C 9/58 |
| | | | | 416/1 |
| 2014/0060658 | A1 | | 3/2014 | Hains |
| 2017/0198640 | A1 | * | 7/2017 | Depoutre ................ F02C 7/224 |

FOREIGN PATENT DOCUMENTS

| | | |
|---|---|---|
| FR | 2 862 724 A1 | 5/2005 |
| FR | 3 021 359 A1 | 11/2015 |
| WO | 2005/073538 A1 | 8/2005 |
| WO | 2013/019656 A2 | 2/2013 |

\* cited by examiner

HYDRAULIC CIRCUIT WITH CONTROLLED RECIRCULATION CIRCUIT

TECHNICAL DOMAIN

The invention relates to a hydraulic circuit for an aircraft turboprop comprising a fluid recirculation circuit.

The invention is particularly applicable to a hydraulic circuit that limits the energy loss due to the presence of the recirculation circuit.

STATE OF PRIOR ART

An open rotor type turboprop comprises external variable pitch propellers.

The turboprop thus comprises a propeller pitch actuation system that is only brought into operation when the propeller pitch has to be modified.

This actuation system comprises a plurality of hydraulic actuators, each of which is associated with one propeller of the turboprop and a pump supplying fluid under pressure to all actuators in the actuation system.

The pump operates continuously during operation of the turboprop. Consequently, the pump has to be lubricated and cooled.

These two functions are performed by the fluid that the pump picks up from a fluid tank and discharges to the actuators.

When the actuation system is brought into operation, the fluid passes through the pump, thus performing pump lubrication and cooling functions, and supplying hydraulic power to the actuators.

The hydraulic circuit comprises a recirculation system so that the pump can operate at non-zero flow, and so that there can be some fluid flow when the actuation system is not in operation.

This recirculation circuit can create a lubrication and cooling system as necessary and sufficient for the pump.

However, such a recirculation circuit implies that a quantity of the fluid flow output from the pump is recirculated, even when the actuation system is in operation, so that the pump has to be overdesigned to compensate for this recirculation flow.

The purpose of the invention is to disclose a hydraulic circuit capable of continuously lubricating the pump, while supplying the entire fluid flow generated by the pump to the actuation system.

PRESENTATION OF THE INVENTION

The invention discloses a hydraulic circuit for an aircraft turboprop comprising a hydraulic fluid tank, a pump, a component that is supplied with fluid pressurised by the pump and that is selectively put into operation, and a fluid recirculation circuit between the pump discharge and the tank, characterised in that it comprises a valve located in the recirculation circuit that is capable of opening the recirculation circuit when the component is not in operation and is capable of closing the recirculation circuit when the component is in operation.

Due to this valve, the recirculation circuit is closed when the actuation system is in operation, such that all fluid output by the pump supplies the component.

Preferably, the valve can change state as a function of the fluid pressure in a component supply pipe, connecting the component to the pump.

Preferably, the valve is capable of closing the recirculation circuit when the value of the pressure in the supply pipe is equal to a low value and the valve does not close the recirculation circuit when the value of the pressure in the supply pipe is greater than or equal to a high value.

Preferably, the hydraulic circuit comprises a recirculation valve control device located in said supply pipe capable of increasing the pressure at least in one segment of said pipe when the component is not in operation.

Preferably, the control device is a controlled check valve that closes off the supply pipe when the component is not in operation, to increase the pressure in a segment of the supply pipe upstream from the check valve and that does not close off the supply pipe when the component is in operation.

Preferably, the recirculation circuit extends from a segment of the supply pipe located between the check valve and the pump, as far as the tank.

Preferably, the component is a system that actuates the pitch of the turboprop propellers.

BRIEF DESCRIPTION OF THE DRAWINGS

Other characteristics and advantages of the invention will become clear after reading the following detailed description, that will be better understood by referring to the appended figures among which.

DETAILED PRESENTATION OF PARTICULAR EMBODIMENTS

Figure 1:
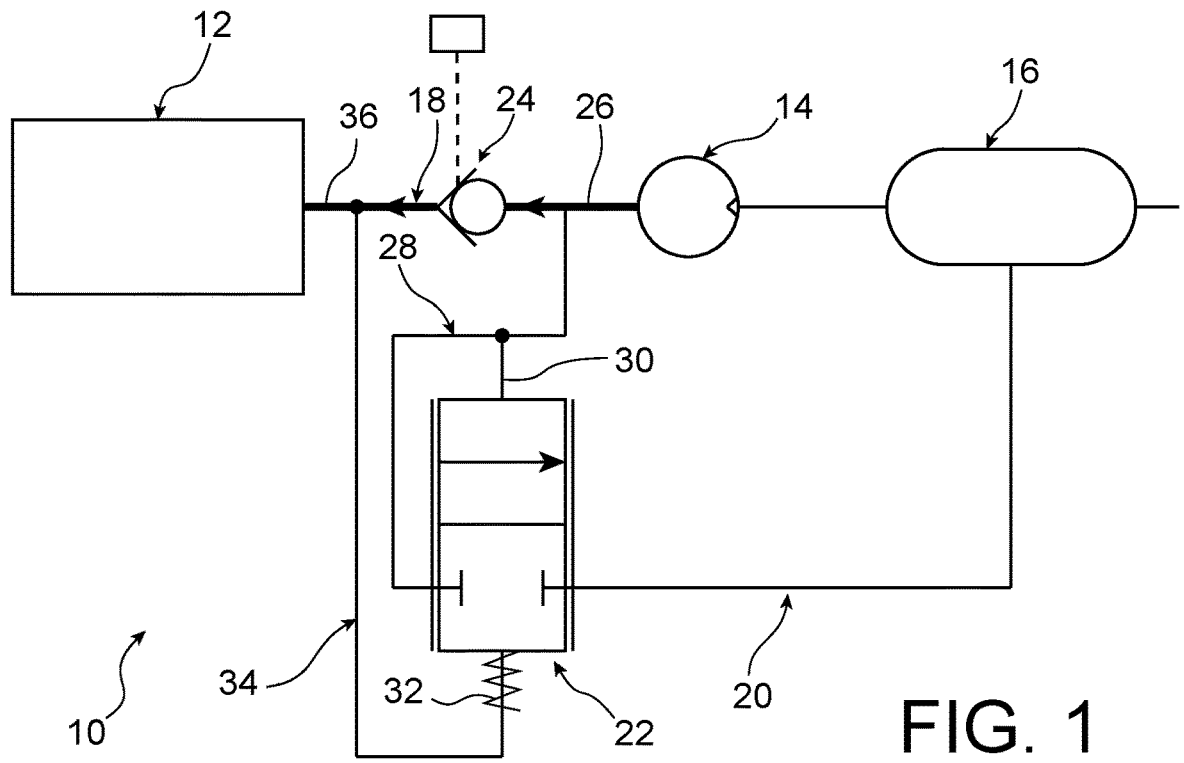
FIG. 1 is a diagrammatic view of a hydraulic circuit according to the invention in which the recirculation valve is in the closed position of the recirculation circuit.

The figures show a hydraulic circuit 10 that is installed on an "open rotor" type of aircraft turboprop.

The hydraulic circuit 10 comprises a component 12 that is a system that actuates the pitch of the turboprop propellers. In the following description, the term component is used to designate the propeller pitch actuation system.

The hydraulic circuit 10 also comprises a supply pump 14 for the component 12 and a tank 16 in which the fluid is stored and towards which the fluid that supplied the component 12 is returned. A supply pipe 18 connects the discharge from the pump 14 to the component 12.

Preferably, the pump 14 is an axial pistons type pump with variable self-regulating capacity, comprising a movable plate. This type of pump is capable of maintaining constant pressure on the discharge side of the pump, while satisfying flow requirements of the component 12 by varying the position of the movable plate.

When the turboprop is in operation, the pump 14 operates continuously, although the component 12 only operates occasionally.

A minimum fluid flow is maintained at the discharge from the pump 14 to cool and lubricate the pump 14 even when the component 12 is not in operation, in other words when the orientation of the blades does not have to be modified.

The hydraulic circuit 10 comprises a recirculation circuit 20 for this purpose that connects the pump outlet to the tank 16 and through which fluid flows at this minimum flow rate.

A recirculation valve 22 is placed across the recirculation circuit 20 so that the recirculation circuit 20 does not reduce the supply flow rate to the component 12.

This valve 22 is designed to close off the recirculation circuit 20 when the component 12 is put into operation, so that the entire fluid flow from the pump 14 is supplied to the component 12. The valve 22 is also designed to open the recirculation circuit 20, in other words so that fluid can circulate in the recirculation circuit 20 when the component 12 is not in operation.

Thus, regardless of the operating conditions of the component 12, there is also at least a minimum flow that passes through the pump 14, thus cooling and lubricating the pump.

In this case, the state change of the valve 22 takes place as a function of the fluid pressure in the supply pipe 18.

In particular, the valve 22 changes to the closed state of the recirculation circuit 20 when the value of the pressure in the supply pipe 18 is equal to a low value and the valve 22 changes to the open state of the recirculation circuit 20 when the value of the pressure in the supply pipe 18 becomes greater than a high value.

The hydraulic circuit 10 comprises a check valve 24 located in the supply pipe 18, to cause a change of pressure in the supply pipe 18. This check valve 24 is a controlled type of check valve and is open when the component 12 is put into operation and is closed when the component 12 is not in operation.

The result is that the check valve 24 closes when the fluid pressure increases in an upstream segment 26 of the supply pipe 18 located between the check valve 24 and the pump 14, to become higher than the fluid pressure in the same upstream segment 26 when the check valve 24 is open.

The recirculation circuit 20 communicates directly with the upstream segment 26 of the supply pipe 18, such that the fluid pressure in an upstream segment 28 of the recirculation circuit 20 is equal to the fluid pressure in the upstream segment 26 of the supply pipe.

A branch connection 30 is made in the upstream segment 28 of the recirculation circuit 20, to control the valve 22 as a function of the fluid pressure in the upstream segment 28 of the recirculation circuit 20 that, as described above, is the fluid pressure in the upstream segment 26 of the supply pipe 18.

As described above, when the fluid pressure increases in the upstream segment 26 of the supply pipe, it becomes greater than or equal to the high value that triggers a state change of the valve 22 to its position in which the recirculation circuit 20 is open.

To facilitate its state change, the valve 22 also comprises an elastic device 32 to force the elastic return of the valve 22 to its closed position and a second branch connection 34 connecting the valve 22 to a downstream segment 36 of the supply pipe 18.

When the check valve 24 is closed, the difference between the fluid pressure in the upstream segment 26 of the supply pipe 18 and in the downstream segment 36 of the supply pipe 18 facilitates the state change of the valve from its position in which the recirculation circuit 20 is open, despite the action of the elastic device 32.

The following description describes operation of the hydraulic circuit 10, with reference to the figures.

The hydraulic circuit 10 shown in FIG. 1 represents the state in which the component 12 is in operation.

In this case, the check valve 24 is controlled to be open. Therefore the supply pipe 18 us not closed, and therefore the fluid pressure in the upstream segment 26 of the supply pipe 18 is equal to the low pressure value.

Therefore the valve 22 is in the state in which the recirculation circuit 20 is closed.

Consequently, the entire fluid from the pump 14 is directed to the component 12.

Figure 2:
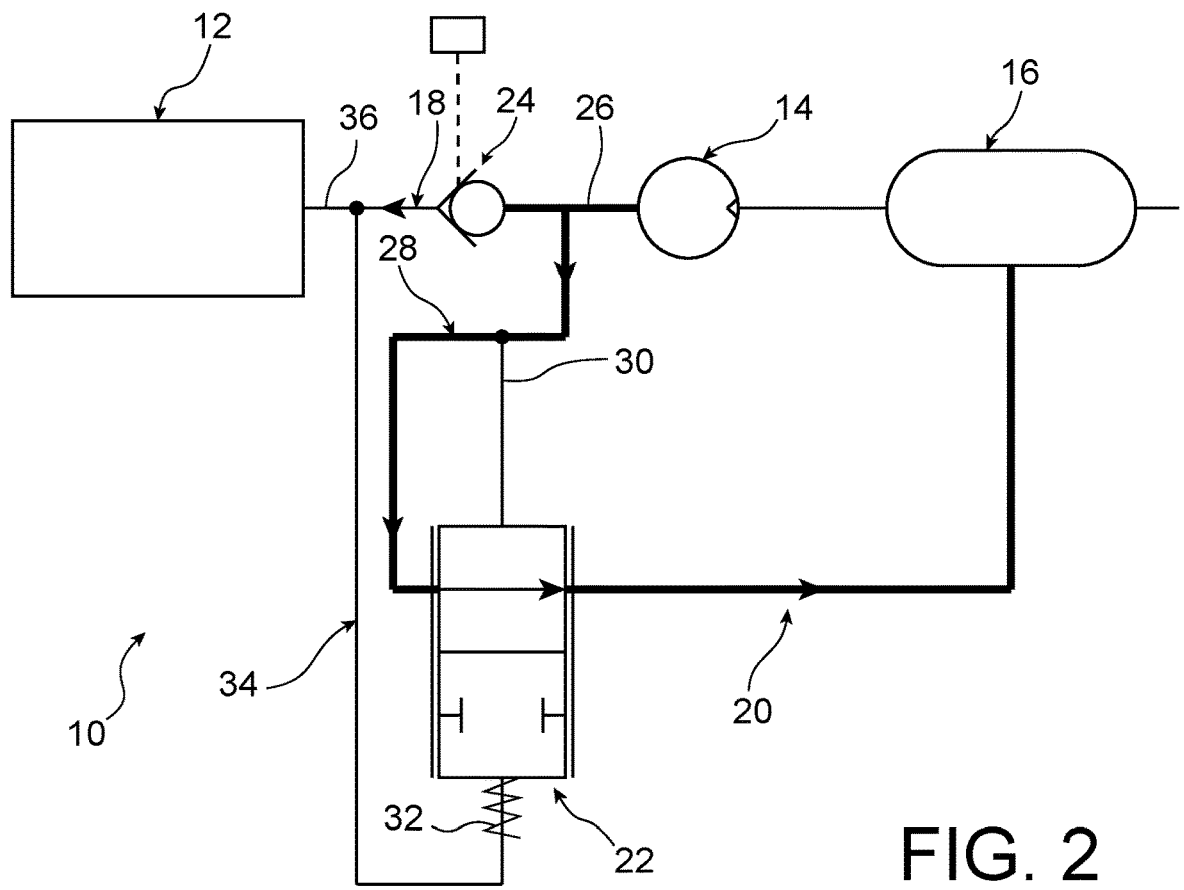
FIG. 2 is a view of the circuit shown on FIG. 1, in which the recirculation valve is in the open position of the recirculation circuit.

When the component 12 is not in operation, the check valve 24 is controlled to be closed, as can be seen in FIG. 2.

The fluid pressure in the upstream segment 26 then increases to reach the high value defined above.

The result is that the valve changes state to open the recirculation circuit 20.

Consequently, the entire fluid from the pump 14 is returned to the tank 16 through the recirculation circuit.

Thus, a non-zero fluid flow always passes through the pump 14 whenever the hydraulic circuit 10 is in operation, and when the component 12 is put into operation, the entire fluid flow output from the pump 14 is used for operation of the component, such that the pump 14 does not need to be overdesigned.

The invention claimed is:

1. A hydraulic circuit for an aircraft turboprop comprising a hydraulic fluid tank, a pump, a component that is supplied with fluid pressurized by the pump and that is selectively put into operation, and a fluid recirculation circuit between a discharge of the pump and the tank,
    the hydraulic circuit comprising a valve located in the recirculation circuit, that only opens the recirculation circuit when the component is not in operation and only closes the recirculation circuit when the component is in operation, the hydraulic circuit comprising a control device of the valve located in a supply pipe of the component, connecting the component to the pump,
    the control device is a controlled check valve that closes off the supply pipe when the component is not in operation, to increase a pressure in a segment of the supply pipe upstream from the check valve and that does not close off the supply pipe when the component is in operation, and
    the component is a turboprop propeller pitch actuation system.

2. The hydraulic circuit according to claim 1, wherein the valve changes state as a function of the fluid pressure in said supply pipe.

3. The hydraulic circuit according to claim 2, wherein the valve closes the recirculation circuit when a value of the pressure in the supply pipe is equal to a low value and the valve does not close the recirculation circuit when the value of the pressure in the supply pipe is greater than or equal to a high value.

4. The hydraulic circuit according to claim 3, wherein the control device of the valve that is located in said supply pipe increases the pressure in the segment of said supply pipe when the component is not in operation.

5. The hydraulic circuit according to claim 1, wherein the recirculation circuit extends from a portion of the segment of the supply pipe, located between the check valve and the pump, to the tank.

* * * * *